United States Patent
Kim et al.

(10) Patent No.: US 11,577,700 B2
(45) Date of Patent: *Feb. 14, 2023

(54) COATING COMPOSITION FOR WIPER BLADE AND METHOD FOR COATING THE WIPER BLADE USING THE SAME

(71) Applicant: CAP CORPORATION, Gyeongsangbuk-do (KR)

(72) Inventors: Ki Young Kim, Gyeongsangbuk-do (KR); Jong Yuen Kim, Gyeongsangbuk-do (KR)

(73) Assignee: CAP CORPORATION, Gyeongsangbuk-Do (KR)

( * ) Notice: Subject to any disclaimer, the term of this patent is extended or adjusted under 35 U.S.C. 154(b) by 140 days.

This patent is subject to a terminal disclaimer.

(21) Appl. No.: 16/898,616

(22) Filed: Jun. 11, 2020

(65) Prior Publication Data

US 2020/0391701 A1    Dec. 17, 2020

(30) Foreign Application Priority Data

Jun. 14, 2019  (KR) ........................ 10-2019-0070945

(51) Int. Cl.
| | |
|---|---|
| B60S 1/38 | (2006.01) |
| C09D 7/20 | (2018.01) |
| C09D 7/41 | (2018.01) |
| C09D 7/61 | (2018.01) |
| C09D 175/04 | (2006.01) |
| C08K 3/38 | (2006.01) |
| C09D 7/40 | (2018.01) |
| C09D 201/00 | (2006.01) |
| C10M 125/02 | (2006.01) |
| C10M 125/22 | (2006.01) |

(Continued)

(52) U.S. Cl.
CPC .................. *B60S 1/38* (2013.01); *C09D 7/20* (2018.01); *C09D 7/41* (2018.01); *C09D 7/61* (2018.01); *C09D 175/04* (2013.01); *B60S 2001/3829* (2013.01)

(58) Field of Classification Search
CPC combination set(s) only.
See application file for complete search history.

(56) References Cited

U.S. PATENT DOCUMENTS 10,883,017 B2 *  1/2021  Kim ........................ C09D 7/20

FOREIGN PATENT DOCUMENTS

FR  2899544 A1 * 10/2007  ................ B60S 1/38
JP  2006232078 A   9/2006

(Continued)

OTHER PUBLICATIONS

Machine translation of KR 2013-0132181A (Year: 2013).*

(Continued)

*Primary Examiner* — Ramsey Zacharia
(74) *Attorney, Agent, or Firm* — Grossman, Tucker, Perreault & Pfleger, PLLC

(57) ABSTRACT

The present invention relates to a coating composition for a wiper blade and a method for coating a wiper blade using the same. More particularly, the present invention relates to a coating composition for a wiper blade and a coating method using the same, which can improve the durability of the wiper blade and prevent discoloration of the wiper blade.

9 Claims, 5 Drawing Sheets

(51) Int. Cl.
  *C10M 125/26* (2006.01)
  *C10M 155/02* (2006.01)

(56) References Cited

FOREIGN PATENT DOCUMENTS

| | | | | |
|---|---|---|---|---|
| JP | 2014-046734 | | 3/2014 | |
| KR | 20130132181 A | * | 10/2013 | ........... C09D 183/02 |

OTHER PUBLICATIONS

Machine translation of FR 2899544 A1 (Year: 2007).*
Korean Office Action with English translation dated Sep. 14, 2020, received in corresponding Korean Patent Application No. 10-2019-0070945, 6 pages.

* cited by examiner

FIG. 3

Evaluation Reference Table for Initial Wiping Performance

| Blade Wiped state | Grade | Objective Evaluation Definition | | | |
|---|---|---|---|---|---|
| | | Range | Condition | No. of lines | Wiped lines state |
|  | 10 | - | - | - | - |
| 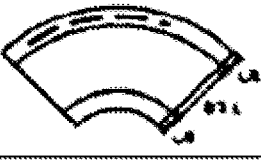 | 9 | 1/6 L | Discontinuous | 1 | Very fine lines ≤0.3mm |
|  | 8 | 1/6 L | Discontinuous | Max 3 | Very fine lines ≤0.3mm |
| 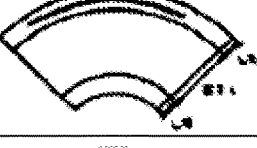 | | 1/6 L | Continuous | 1 | Very fine lines ≤0.3mm |
|  | 7 | 1/6 L | Continuous | Max 3 | Very fine lines ≤0.3mm |
|  | | 2/3 L | Discontinuous | 1 | Very fine lines ≤0.3mm |
|  | | 1/6 L | Continuous | Max 4 | Fine lines ≤1.0mm |
|  | 6 | 1/6 L and 2/3 L | Discontinuous | Max 12 | Very fine lines ≤0.3mm |
|  | | 2/3 L | Continuous | 1 | Very fine lines ≤0.3mm |

FIG. 4A

| Blade Wiped state | Grade | Objective Evaluation Definition ||||
|---|---|---|---|---|---|
| | | Range | Condition | No. of lines | Wiped lines state |
| | 6 | 1/6 L | Continuous | Max 6 | Fine lines ≤1.0mm |
| | 5 | 1/6 L and 2/3 L | Discontinuous | Max 20 | Very fine lines ≤0.3mm |
| | | 2/3 L | Continuous | Max 2 | Very fine lines ≤0.3mm |
| | 4 | 1/6 L and 2/3 L | Continuous | Many | Even stripes with widths, 75% or more wiped of the entire area |
| | 3 | 1/6 L and 2/3 L | Continuous | Many | Grade 4-type lines, 2/3L concentrated and 75% or less wiped |
| | | 1/6 L and 2/3 L | Continuous | - | Evidence of water film |
| | 2 | 1/6 L and 2/3 L | Continuous | - | Marks due to blade and elements |
| | | 1/6 L and 2/3 L | Continuous | - | Hazing formed |
| | 1 | 1/6 L and 2/3 L | Continuous | - | Evidence of Chattering |

FIG. 4B

COATING COMPOSITION FOR WIPER BLADE AND METHOD FOR COATING THE WIPER BLADE USING THE SAME

CROSS REFERENCE TO RELATED APPLICATION(S)

This application claims the benefit under 35 USC § 119(a) of Korean Patent Application No. 10-2019-0070945 filed on Jun. 14, 2019 in the Korean Intellectual Property Office, the entire disclosure of which is incorporated herein by reference for all purposes.

BACKGROUND

1. Field

The present invention relates to a coating composition for a wiper blade and a method for coating the wiper blade using the same. More particularly, the present invention relates to a coating composition for a wiper blade and a method for coating the wiper blade using the same that can improve the durability of the wiper blade and prevent discoloration of the wiper blade.

2. Description of Related Art

Wipers are used to remove water and debris from smooth surfaces of glasses, etc. of industrial machineries such as vehicles, aircraft, ships, and the like.

A wiper blade rubber is mounted on the sliding portion of the wiper. For example, in a windshield (windscreen) wiper for an automobile, rain, snow, dust, mud, and the like attached to the glass surface are removed by the operation of the wiper blade rubber as the wiper is driven. As a base material of the wiper blade rubber, a resin elastomer or the like is used in addition to a rubber material, but a rubber material is generally used.

The wiper blade rubber is torn by friction and foreign materials such as sand when used for a long time. This may interfere driving due to chattering, noises, and marks after cleaning caused by the torn rubber.

Accordingly, various wiper blade rubbers and lubricant-related technologies for coating the wiper blade have been developed.

The wiper blade is generally made from rubber, specifically vulcanized natural rubber or synthetic rubber. Coating treatments for chlorinating the strip surface of the wiper blade or overlaying a lubricating powder such as molybdenum sulfide have been proposed to improve glissement properties of the rubber.

However, coating a wiper lip requires a considerable amount of time until the coating is completed. In addition, coating liquid may adhere to other equipment and products during the coating operation. The coating liquid on the surface of the wiper lip can be damaged during assembly with a wiper lip cover, which is used to protect the wiper lip of the finished wiper blade. In addition, the coating liquid on the surface of the wiper lip has a disadvantage in that it is easily discolored as the light resistance and heat resistance are deteriorated with time.

Japanese Patent Publication No. 2006-232078A discloses a technology related to a wiper blade.

SUMMARY

An object of the present invention is to provide a coating composition for a wiper blade that can improve the durability of the wiper blade.

Another object of the present invention is to provide a coating composition for a wiper blade that can prevent discoloration of the wiper blade.

Further another object of the present invention is to provide a method for coating a wiper blade using a coating composition for a wiper blade that can improve the durability of the wiper blade and prevent discoloration of the wiper blade.

According to one aspect, there is provided a coating composition for a wiper blade including 9 wt % to 21 wt % of a solid lubricant including boron nitride, based on the total weight of the coating composition; an organic solvent; a binder; and an additive.

According to one embodiment, the coating composition for a wiper blade may include 75 wt % to 88 wt % of an organic solvent; 2 wt % to 9 wt % of a binder; and 0.5 wt % to 3 wt % of an additive, based on the total weight of the coating composition.

According to one embodiment, the boron nitride may be included in an amount of 10 wt % to 15 wt % based on the total weight of the coating composition.

According to one embodiment, the solid lubricant may further include a pigment.

According to one embodiment, the coating composition for a wiper blade may include 15 wt % to 21 wt % of solid lubricant including boron nitride; 70 wt % to 81 wt % of an organic solvent; 3 wt % to 10 wt % of a binder; and 0.5 wt % to 5 wt % of an additive, based on the total weight of the coating composition.

According to one embodiment, the pigment may include a pearl pigment or an organic pigment.

According to one embodiment, the pearl pigment or the organic pigment may be included in an amount of 1 wt % to 10 wt %.

According to one embodiment, the pearl pigment may have a diameter of 9 to 50 μm.

According to one embodiment, the solid lubricant may further include at least one selected from graphite, polytetrafluoroethylene, molybdenum disulfide, PE powder, silicone resin powder, silicone rubber powder, and hybrid silicone powder.

According to one embodiment, a coating composition for a wiper blade is provided, wherein the wiper blade is made of at least one of natural rubber, butadiene rubber, styrene-butadiene rubber, EPDM rubber, and chloroprene rubber.

According to one embodiment, the durability of the wiper blade may be improved.

According to one embodiment, the discoloration of the wiper blade may be prevented.

According to another aspect, there is provided a coating method including coating a wiper blade with a coating composition for a wiper blade.

According to one embodiment, a slip property may be increased by including a certain amount of boron nitride, thereby increasing the durability of the wiper blade to a level equal to or greater than that of graphite. Particularly, according to the present application, it may be possible to improve the durable wiping performance of the wiper blade.

According to an embodiment, even if a product such as a rubber-based wiper blade is exposed to an external environment, such as ultraviolet rays, for a long time, the product may be prevented from discoloring.

According to an embodiment, long-term storage performances may be improved by using an organic pigment or a pearl pigment having excellent light resistance and coatings of various colors may be implemented.

Other objects and features of this disclosure will become more apparent from the following detailed description, the drawings, and the claims.

BRIEF DESCRIPTION OF THE DRAWINGS

FIG. 3 is a table of images illustrating the degree of discoloration on the outside over time after coating a wiper blade with the coating compositions of Comparative Examples 1 and 10 to 12 and Examples 4 to 10.

FIGS. 4A and 4B is an evaluation reference table for durable wiping in the evaluation of performance of a wiper blade.

DETAILED DESCRIPTION

Figure 1:
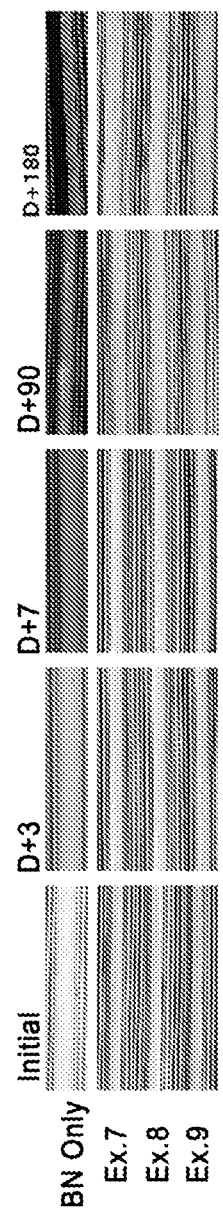
FIG. 1 is an image illustrating the degree of discoloration on the outside over time after coating a wiper blade with the coating compositions of Comparative Example 1 and Examples 7 to 9 of the present invention.

While the present disclosure has been described with reference to particular embodiments, it is to be appreciated that various changes and modifications may be made by those skilled in the art without departing from the spirit and scope of the present disclosure, as defined by the appended claims and their equivalents. Throughout the description of the present disclosure, when describing a certain technology is determined to evade the point of the present disclosure, the pertinent detailed description will be omitted.

In order that the invention may be more readily understood, certain terms are first defined here for convenience. Unless otherwise defined herein, the scientific and technical terms used in this disclosure will have the meaning generally understood by those who are skilled in the art. As used herein, the term 'comprising' does not exclude other elements unless specifically stated otherwise but may include other elements.

Hereinafter, although more detailed descriptions will be given by exemplary embodiments, those are only for explanation and there is no intention to limit the disclosure. Accordingly, the exemplary embodiments disclosed in the present disclosure do not limit but describe the spirit of the present disclosure, and the scope of the present disclosure is not limited by the exemplary embodiments.

According to one aspect, a coating composition for a wiper blade may include 9 wt % to 21 wt % of a solid lubricant including boron nitride; 75 wt % to 88 wt % of an organic solvent; 2 wt % to 9 wt % of a binder; and 0.5 wt % to 3 wt % of an additive, based on the total weight of the coating composition.

The solid lubricant may be added in an amount of 9 wt % to 21 wt %, preferably 10 wt % to 15 wt %, based on the total weight of the coating composition and includes boron nitride as a main component to improve slip (wiping) performance and durability. When the solid lubricant is added in an amount of less than 9 wt % based on the total weight of the coating composition, the slip (wiping) performance may be insufficient and the durability may be reduced. On the other hand, when it is added in an amount of more than 21 wt %, the strength of the coating film of the wiper blade may be reduced, thereby deteriorating lubrication durability. However, it is not limited thereto.

The solid lubricant may include boron nitride (BN) as a main component to improve the durable wiping performance of the wiper blade. The solid lubricant of the present application has excellent durable wiping performance compared to conventional hybrid coating compositions including graphite and/or Si powder. In addition, when the solid lubricant includes boron nitride, coloring property of the wiper blade may become improved.

Boron nitride has a crystal structure similar to a pyrocarbon, has excellent oxidation resistance, and forms boron oxide ($B_2O_3$) when an oxidation proceeds. In addition, the formed boron oxide exhibits a self-healing function at high temperature and, thus, it is known as the most suitable method for an interfacial controlled coating.

Boron nitride is called as white graphite, has excellent machinability, and has chemical and physical properties similar to graphite since it has a hexagonal structure similar to graphite. However, there is difference between these two materials since boron nitride is a white and excellent insulator and graphite is an electrically conductive material.

The hexagonal boron nitride (h-BN) powder has a scaly crystal structure and is used in a wide range of industrial fields because of its excellent lubrication at high temperature, releasability, electrical insulation, heat resistance and chemical stability.

In addition, boron nitride may be suitable for a wiper blade that is used under conditions of changing from a dry state to a wet state since boron nitride has a hexagonal structure and dose not loose lubricity even when it is in contact with water. The solid lubricant may include boron nitride as a main component. The solid lubricant may include boron nitride alone or in combination of two or more as long as it satisfies the performance.

The solid lubricant may further include at least one selected from graphite, polytetrafluoroethylene (PTFE), molybdenum disulfide ($MoS_2$), PE powder, silicone resin powder, silicone rubber powder, and hybrid silicone powder to improve slip (wiping) properties in addition to boron nitride.

The organic solvent may not be particularly limited as long as it can dissolve the binder and, thus, any known organic solvent may be used. The organic solvent may be methylethyl ketone, toluene, xylene, ethyl acetate, butyl acetate, ethanol, or a mixture thereof. However, it is not limited thereto. The organic solvent may be used alone or in combination of two or more as long as it can completely dissolve the binder.

The organic solvent may be used in an amount of 75 wt % to 88 wt % based on the total weight of the coating composition to improve durability and/or prevent discoloration of the wiper blade.

The binder may be a modified polyurethane resin.

The coating composition may lower the friction coefficient of the binder itself by using a binder exhibiting proper elasticity and extensibility, and achieve both low friction and wear resistance by using an optimum amount of the solid lubricant.

However, when the binder is used in an amount of more than 9 wt % based on the total weight of the coating composition, it may cause stripe marks or noises after wiping with the wiper blade. In addition, when the binder is used in an amount of more than 9 wt % based on the total weight of the coating composition, the friction coefficient may be rapidly increased and the sliding property may be deteriorated when sand is attached to the wiper blade because an amount of the solid lubricant becomes relatively small.

The additive may be a dispersant, a defoaming agent, a leveling agent, an emulsifier, an ultraviolet absorber, an anti-settling agent or the like. The additive may further include a filler such as kaolin, talc, silica, calcium carbonate, mica, titanium dioxide, alumina, urethane rubber powder, acrylic powder, and the like. Among the additives, the dispersant and the anti-settling agent may be used in an amount of 0.5 wt % to 3 wt % based on the total weight of the coating composition to improve discoloration effect and durable wiping performance.

According to another aspect, the solid lubricant of the coating composition for a wiper blade may further include a pigment.

According to another aspect, the coating composition for a wiper blade including a pigment includes: 15 wt % to 21 wt % of a solid lubricant based on the total weight of the coating composition and including boron nitride; 70 wt % to 81 wt % of an organic solvent; 3 wt % to 10 wt % of a binder; and 0.5 wt % to 5 wt % of an additive.

A rubber-based wiper blade is a product that is exposed to an external environment, such as ultraviolet light, for a long time. When it is exposed to ultraviolet light for a long time, an anti-aging agent and/or an antiozonant may leak out and discolor the wiper blade. Particularly, when white boron nitride is included in a general rubber, the possibility of discoloration is relatively high. By adding a pigment thereto, discoloration may be prevented, and the aesthetic feeling of the wiper blade may be enhanced.

The pigment may include a pearl pigment or an organic pigment.

The pearl pigment is a plate-shaped crystal having an aspect ratio, unlike a general organic pigment and an inorganic pigment. The reflected light generated by a difference between a refractive index of the plate-shaped crystal and a refractive index of a medium causes interference. Thereby, the pearl pigment is an effect pigment having an optical effect giving a pearlescent or metallic luster like natural pearls. The properties of the pearl pigment depend on a size, shape, and thickness, are transmissive and reflective, and have an interference effect by light.

The organic pigment is a pigment referring to colored material made of an organic substance and is called as a lake pigment made by precipitating a dye with an insoluble salt on an extender pigment.

In addition, a pigment prepared using dye synthesis technology is referred to as a synthetic organic pigment. Unlike the inorganic pigment, the organic pigment and the synthetic organic pigment have vivid colors and good tinting strength, but are poor in light resistance and heat resistance. The basic skeleton of the synthetic organic pigment is a hydrocarbon composed of covalent bonds of carbon-carbon and carbon-hydrogen.

The pearl pigment or the organic pigment may be added in an amount of 1 wt % to 10 wt %, more preferably 3 wt % to 7 wt %, based on the total weight of the coating composition.

The pearl pigment may be added in an amount of 1 wt % to 10 wt % to improve the discoloration prevention and durable wiping performance of the wiper blade. If the amount of the pearl pigment in the solid lubricant is less than 1 wt % based on the total weight of the coating composition, it may be difficult to obtain surface smoothness and coating film strength. On the other hand, if it exceeds 10 wt %, the strength of the coating film of the wiper blade may be deteriorated and further the lubrication durability may be decreased. However, it is not limited thereto.

The pearl pigment may prevent or inhibit fading or discoloration within the above range. The pearl pigment may be coated with one of gold, silver, and blue colors, which is not limited thereto, and maintain the color as it is over a long period of time. The coating composition for a wiper blade of the present application may be gold, silver, or blue, and effectively prevent discoloration regardless of color.

The pearl pigment may have a diameter of 9 to 50 µm, but it is not limited thereto. The pearl pigment may preferably have a diameter of 9 to 50 µm for preventing fading or discoloration of the wiper blade and the color of the pearl pigment may be gold or silver. The pearl pigment may preferably have a diameter of 9 to 40 µm for preventing fading or discoloration of the wiper blade and the color of the pearl pigment may be blue.

The solid lubricant may be added in an amount of 15 wt % to 21 wt % based on the total weight of the coating composition for improving slip performance and durability, but it is not limited thereto. If the solid lubricant may be added in an amount of less than 15 wt % based on the total weight of the coating composition, the slip performance may be insufficient and the durability may be reduced. On the other hand, if the solid lubricant is added in an amount of more than 21 wt % based on the total weight of the coating composition, the strength of the coating film and the lubrication durability of the wiper blade may be deteriorated.

The boron nitride may be added in an amount of 10 wt % to 15 wt % based on the total weight of the coating composition for improving durability and preventing discoloration of the wiper blade, but it is not limited thereto. If the boron nitride is added in an amount of less than 10 wt % based on the total weight of the coating composition, it may be difficult to obtain lubricity. On the other hand, if it exceeds 15 wt %, the strength of the coating film of the wiper blade may be lowered, resulting in poor lubrication durability.

The organic solvent may be added in an amount of 70 wt % to 81 wt %, preferably 74 to 81 wt %, based on the total weight of the coating composition for improving durability and preventing discoloration of the wiper blade, but it is not limited thereto.

When the binder is contained in an amount of more than 10 wt % based on the total weight of the coating composition, it may cause stripe marks or noises after wiping with the wiper blade. In addition, the friction coefficient may be rapidly increased and the sliding property may be deteriorated when sand is attached to the wiper blade because an amount of the solid lubricant becomes relatively low.

The additive may be at least one selected from a dispersing agent, an antifoaming agent, a leveling agent, an emulsifying agent, an ultraviolet absorber, and an anti-settling agent. In addition, the additive may further include at least one filler selected from kaolin, talc, silica, calcium carbonate, mica, titanium dioxide, alumina, urethane rubber powder, acrylic powder, and the like. Among the additives, the dispersing agent and the anti-settling agent may be added in an amount of 0.5 wt % to 5 wt % based on the total weight of the coating composition for improving durability and preventing discoloration of the wiper blade.

The solid lubricant may further include at least one selected from graphite, polytetrafluoroethylene, molybdenum disulfide, PE powder, silicone resin powder, silicone rubber powder, and hybrid silicone powder, but it is not limited thereto. The solid lubricant may further include graphite in an amount of 1 wt % to 3 wt % based on the total weight of the coating composition for improving durability and preventing discoloration of the wiper blade.

The wiper blade of the present application may be made of silicone rubber or general rubber. The general rubber may be composed of at least one of natural rubber, butadiene rubber, styrene-butadiene rubber, EPDM rubber, and chloroprene rubber, but it is not limited thereto. The material of the wiper blade of the present application may be not particularly limited as long as it satisfies necessary performances such as adhesion to rubber and conformability to rubber extensibility and may be used alone or in combination of two or more.

The coating composition for a wiper blade of the present application may improve durability due to excellent durable wiping grade of the wiper blade.

The coating composition for a wiper blade of the present application may be particularly excellent in improving durability and preventing discoloration of the wiper blade. An antiozonant or an anti-aging agent contained in a rubber-based composition used for a wiper blade leaks out when the wiper blade is exposed to the external environment for a long time, which further causes discoloration of the white boron nitride. However, the coating composition of the present application may effectively prevent the discoloration even in long-term use by using a pearl pigment having excellent light resistance.

The coating composition for a wiper blade of the present application may be used for at least one of a hose, a cable plug, a traction cable, and an external cable, in addition to the wiper blade.

According to another aspect, there is provided a coating method comprising coating a coating composition for a wiper blade herein on a wiper blade.

The step of coating a coating composition for a wiper blade on a wiper blade may be performed by a known coating method, for example, by spraying or dipping.

Coating by the spraying method has some advantages since its coating equipment is relatively simple, and it is advantageous for a continuous process and has a better uniform coating surface than the dipping method. However, it also has some drawbacks of high consumption of a coating liquid and causing scattering.

In the embodiments of the present application, the coating composition of the present application may be sprayed onto a surface of a wiper blade rubber with a spray gun at a constant speed and spray amount to be a constant height, followed by curing a coating film at room temperature and then heating in a drying furnace.

Hereinafter, it will be described in detail by examples of the present invention. However, the following examples illustrate the present invention only, and the present invention is not limited by the following examples.

EXAMPLES

1. Preparation of Coating Compositions for a Wiper Blade

Coating compositions for a wiper blade of Comparative Examples 1 to 9 and Examples 1 to 3 were prepared as follows according to the compositions in Table 1.

1-1. Coating Compositions of Comparative Examples 1 to 3

Coating compositions for a wiper blade of Comparative Examples 1 to 3 were prepared by mixing and dispersing 3 wt %, 5 wt %, and 7 wt % of a modified polyurethane resin, respectively; 88 wt %, 86 wt %, and 84 wt % of toluene, respectively; 8.5 wt % of boron nitride; and 0.5 wt % of an additive.

1-2. Coating Compositions of Comparative Examples 4 to 6

Coating compositions for a wiper blade of Comparative Examples 4 to 6 were prepared by mixing and dispersing 3 wt %, 5 wt %, and 7 wt % of a modified polyurethane resin, respectively; 88 wt %, 86 wt %, and 84 wt % of toluene, respectively; 8.5 wt % of graphite; and 0.5 wt % of an additive.

1-3. Coating Compositions of Comparative Examples 7 to 9

Coating compositions for a wiper blade of Comparative Examples 7 to 9 were prepared by mixing and dispersing 3 wt %, 5 wt %, and 7 wt % of a modified polyurethane resin, respectively; 84 wt %, 82 wt %, and 80 wt % of toluene, respectively; 12.5 wt % of graphite; and 0.5 wt % of an additive.

1-4. Coating Compositions of Examples 1 to 3

Coating compositions for a wiper blade of Examples 1 to 3 were prepared by mixing and dispersing 3 wt %, 5 wt %, and 7 wt % of a modified polyurethane resin, respectively; 84 wt %, 82 wt %, and 80 wt % of toluene, respectively; 12.5 wt % of boron nitride; and 0.5 wt % of an additive.

The units of the amounts of the components in Table 1 are wt %.

TABLE 1

| | Category (wt. %) | Comp. Ex. 1 | Comp. Ex. 2 | Comp. Ex. 3 | Ex. 1 | Ex. 2 | Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|---|---|
| Binder | Modified polyurethane resin | 3 | 5 | 7 | 3 | 5 | 7 | 3 | 5 | 7 | 3 | 5 | 7 |
| Solvent | Toluene | 88 | 86 | 84 | 84 | 82 | 80 | 88 | 86 | 84 | 84 | 82 | 80 |
| Solid lubricants | Boron nitride | 8.5 | 8.5 | 8.5 | 12.5 | 12.5 | 12.5 | 0 | 0 | 0 | 0 | 0 | 0 |
| | Graphite | 0 | 0 | 0 | 0 | 0 | 0 | 8.5 | 8.5 | 8.5 | 12.5 | 12.5 | 12.5 |
| Additives | Anti-settling agent, Dispersing agent | 0.5 | 0.5 | 0.5 | 0.5 | 0.5 | 0.5 | 0.5 | 0.5 | 0.5 | 0.5 | 0.5 | 0.5 |
| | Total(wt. %) | 100 | 100 | 100 | 100 | 100 | 100 | 100 | 100 | 100 | 100 | 100 | 100 |

2. Preparation of Coating Compositions for a Wiper Blade Including a Pigment

Coating compositions for a wiper blade of Comparative Examples 10 to 16 and Examples 4 to 10 were prepared as follows according to the compositions in Table 2.

2-1. Coating Compositions of Comparative Examples 10 to 12

Coating compositions for a wiper blade of Comparative Examples 10 to 12 were prepared by mixing and dispersing 5 wt % of a modified polyurethane resin; 78 wt % of toluene; 8.5 wt % of boron nitride; 4 wt % of graphite; 4 wt % of a pearl pigment (one selected from Gold, Silver, and Blue); and 0.5 wt % of an additive. The coating compositions for a wiper blade of Comparative Examples 10 to 12 differ only in the color of the pearl pigment.

wt % of an additive. The coating compositions for a wiper blade of Examples 7 to 9 differ only in the color of the pearl pigment.

2-6. Coating Composition of Example 10

A coating composition of Example 10 was prepared by mixing and dispersing 5 wt % of a modified polyurethane resin, 78 wt % of toluene, 12.5 wt % of boron nitride, 4 wt % of an organic pigment, and 0.5 wt % of an additive.

The units of the amounts of the components in Table 2 are wt %.

TABLE 2

| Category (wt. %) | | Comp. Ex. 10 | Comp. Ex. 11 | Comp. Ex. 12 | Ex. 4 | Ex. 5 | Ex. 6 | Ex. 7 | Ex. 8 | Ex. 9 | Ex. 10 | Comp. Ex. 13 | Comp. Ex. 14 | Comp. Ex. 15 | Comp. Ex. 16 |
|---|---|---|---|---|---|---|---|---|---|---|---|---|---|---|---|
| Binder | Modified polyurethane resin | 5 | 5 | 5 | 5 | 5 | 5 | 5 | 5 | 5 | 5 | 5 | 5 | 5 | 3 |
| Solvent | Toluene | 78 | 78 | 78 | 76 | 76 | 76 | 74 | 74 | 74 | 78 | 70 | 70 | 70 | 91.5 |
| Solid lubricants | Boron nitride | 8.5 | 8.5 | 8.5 | 12.5 | 12.5 | 12.5 | 12.5 | 12.5 | 12.5 | 12.5 | 16.5 | 16.5 | 16.5 | 0 |
| | Graphite | 4 | 4 | 4 | 2 | 2 | 2 | 2 | 2 | 2 | 0 | 2 | 2 | 2 | 5 |
| | Organic pigment | 0 | 0 | 0 | 0 | 0 | 0 | 0 | 0 | 0 | 4 | 0 | 0 | 0 | 0 |
| | Pearl pigment (9~40 um) | 4(G) | 4(S) | 0 | 4(G) | 4(S) | 0 | 6(G) | 6(S) | 0 | 0 | 6(G) | 6(S) | 0 | 0 |
| | Pearl pigment (9~50 um) | 0 | 0 | 4(B) | 0 | 0 | 4(B) | 0 | 0 | 6(B) | 0 | 0 | 0 | 6(B) | 0 |
| Additives | Anti-settling agent, Dispersing agent | 0.5 | 0.5 | 0.5 | 0.5 | 0.5 | 0.5 | 0.5 | 0.5 | 0.5 | 0.5 | 0.5 | 0.5 | 0.5 | 0.5 |
| Total(wt. %) | | 100 | 100 | 100 | 100 | 100 | 100 | 100 | 100 | 100 | 100 | 100 | 100 | 100 | 100 |

2-2. Coating Compositions of Comparative Examples 13 to 15

Coating compositions for a wiper blade of Comparative Examples 13 to 15 were prepared by mixing and dispersing 5 wt % of a modified polyurethane resin; 70 wt % of toluene; 16.5 wt % of boron nitride; 2 wt % of graphite; 6 wt % of a pearl pigment (one selected from Gold, Silver, and Blue); and 0.5 wt % of an additive. The coating compositions for a wiper blade of Comparative Examples 13 to 15 differ only in the color of the pearl pigment.

2-3. Coating Composition of Comparative Example 16

A coating composition for a wiper blade of Comparative Example 16 was prepared by mixing and dispersing 3 wt % of a modified polyurethane resin; 91.5 wt % of toluene; 5 wt % of graphite as a solid lubricant; and 0.5 wt % of an additive.

2-4. Coating Compositions of Examples 4 to 6

Coating compositions for a wiper blade of Examples 4 to 6 were prepared by mixing and dispersing 5 wt % of a modified polyurethane resin; 76 wt % of toluene; 12.5 wt % of boron nitride; 2 wt % of graphite; 4 wt % of a pearl pigment (one selected from Gold, Silver, and Blue); and 0.5 wt % of an additive. The coating compositions for a wiper blade of Examples 4 to 6 differ only in the color of the pearl pigment.

2-5. Coating Compositions of Examples 7 to 9

Coating compositions for a wiper blade of Examples 7 to 9 were prepared by mixing and dispersing 5 wt % of a modified polyurethane resin; 74 wt % of toluene; 12.5 wt % of boron nitride; 2 wt % of graphite; 6 wt % of a pearl pigment (one selected from Gold, Silver, and Blue); and 0.5

3. Coating a Wiper Blade

Each coating composition for a wiper blade was coated on a wiper blade using a spraying method, which is one of general coating methods.

The coating composition of the present application was sprayed onto a surface of a wiper blade rubber with a spray gun at a constant speed and spray amount to be a constant height, followed by curing a coating film at room temperature and then heating in a drying furnace.

Then, the following experiments were conducted to determine the durability and anti-discoloration effect of the wiper blade.

Experiment Example 1. Determining Durable Wiping Grades

A tester that met the tester used to evaluate performance of the wiper blade prescribed in JIS D5710 was used and a wiper was operated 500,000 cycles when water is sprayed uniformly at 500 cc/min. The operating speed of the wiper blade was 40 cycles/min. The evaluation was carried to determine whether there was wiping performance and noise at operation of 100,000, 200,000, 300,000 and 500,000 cycles. Wiping performance was determined when the wiper blade was closed. However, if vibrations were significant and operations not smooth, the test was suspended. The evaluation reference table for durable wiping is as in FIGS. 4A and 4B.

In addition, the wiper blades coated with the coating compositions obtained in Examples and Comparative Examples were tested for the initial wiping grade and the durable wiping grade. The result is summarized in Table 3).

TABLE 3

| Category | Comp. Ex. 1 | Comp. Ex. 2 | Comp. Ex. 3 | Ex. 1 | Ex. 2 | Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|---|
| Initial wiping grade | 7/7 | 8/8 | 8/7 | 8/8 | 8/9 | 8/8 | 8/9 | 9/8 | 8/9 | 8/8 | 7/9 | 8/7 |
| Durable wiping grade (200,000 cycles) | 5/6 | 5/6 | 4/6 | 7/7 | 7/8 | 8/7 | 5/5 | 6/5 | 6/6 | 5/5 | 6/5 | 5/4 |

| Category | Comp. Ex. 10 | Comp. Ex. 11 | Comp. Ex. 12 | Ex. 4 | Ex. 5 | Ex. 6 | Ex. 7 | Ex. 8 | Ex. 9 | Ex. 10 | Comp. Ex. 13 | Comp. Ex. 14 | Comp. Ex. 15 | Comp. Ex. 16 |
|---|---|---|---|---|---|---|---|---|---|---|---|---|---|---|
| Initial wiping grade | 7/7 | 8/7 | 7/7 | 8/8 | 8/9 | 9/9 | 9/8 | 9/8 | 9/9 | 8/8 | 7/6 | 6/6 | 6/7 | 8/8 |
| Durable wiping grade (200,000 cycles) | 5/4 | 5/7 | 4/6 | 6/7 | 6/7 | 6/7 | 6/7 | 5/8 | 7/7 | 6/6 | 5/3 | 4/4 | 3/5 | 3/7 |

As shown in Table 3, the durable wiping grade (200,000 cycles) of Examples 1 to 3 including boron nitride as a main component of a solid lubricant were 7/7 to 8/7. It is noted that the durable wiping grade of Examples 1 to 3 are better than those of Comparative Examples 1 to 9.

The initial wiping grades of Examples 4 to 10 including boron nitride as a main component of a solid lubricant and a graphite and a pearl pigment as auxiliary components of a solid lubricant, were 8/8 to 9/9. It is noted that the initial wiping grades of Examples 4 to 10 are better than those of Comparative Examples 10 to 16.

The durable wiping grades (200,000 cycles) of Examples 4 to 10 were 5/8 to 7/7. It is noted that the durable wiping grade of Examples 4 to 10 are better than those of Comparative Examples 10 to 16.

Experiment Example 2. Test for Discoloration (Light Resistance)

The test for discoloration (light resistance) for a rubber coating was conducted by determining the degree of color change after leaving a rubber coating product under actual climatic conditions (6 months).

In the coating using a general graphite, discoloration due to chemicals leaked from the rubber was not clearly confirmed since the graphite is black. On the other hand, in the coating using boron nitride (BN), it was confirmed that all showed color change due to chemicals leaked from the rubber since the boron nitride is white.

FIG. 1 is an image illustrating the degree of discoloration on the outside over time after coating a wiper blade with the compositions of Comparative Example 1 and Examples 7 to 9 of the present invention.

According to FIG. 1, it was confirmed that coating with the coating compositions of Examples 7 to 9 did not show color change even after 180 days and the color at the time of coating was well maintained, which was much better than that with the coating composition including only boron nitride as a solid lubricant of Comparative Example 1.

Figure 2:
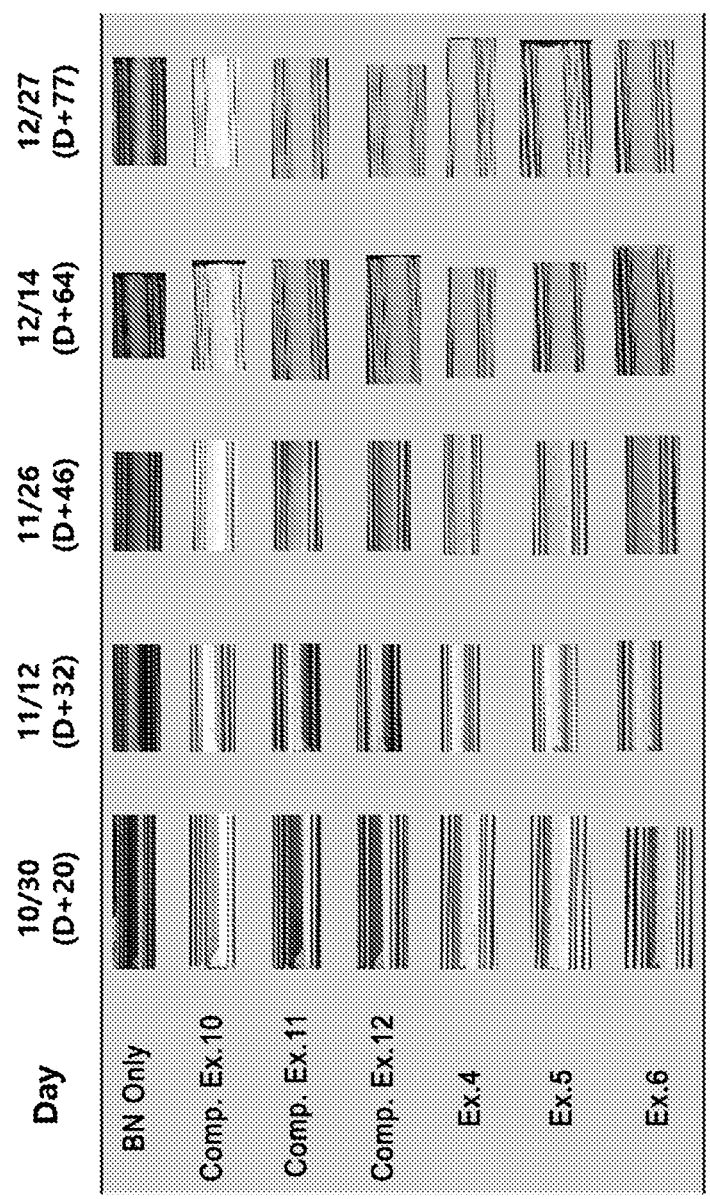
FIG. 2 is a table of images illustrating the degree of discoloration on the outside over time after coating a wiper blade with the coating compositions of Comparative Examples 1 and 10 to 12 and Examples 4 to 6.

FIG. 2 is a table of images illustrating the degree of discoloration on the outside over time after coating a wiper blade with the compositions of Comparative Examples 1 and 10 to 12 and Examples 4 to 6.

According to FIG. 2, it was confirmed that coating with the coating compositions of Examples 4 to 6 did not show color change even after 77 or more days on the outside and the color at the time of coating was well maintained, which was much better than that with the coating composition including only boron nitride as a solid lubricant of Comparative Example 1 and 10 to 12.

Figure 3:
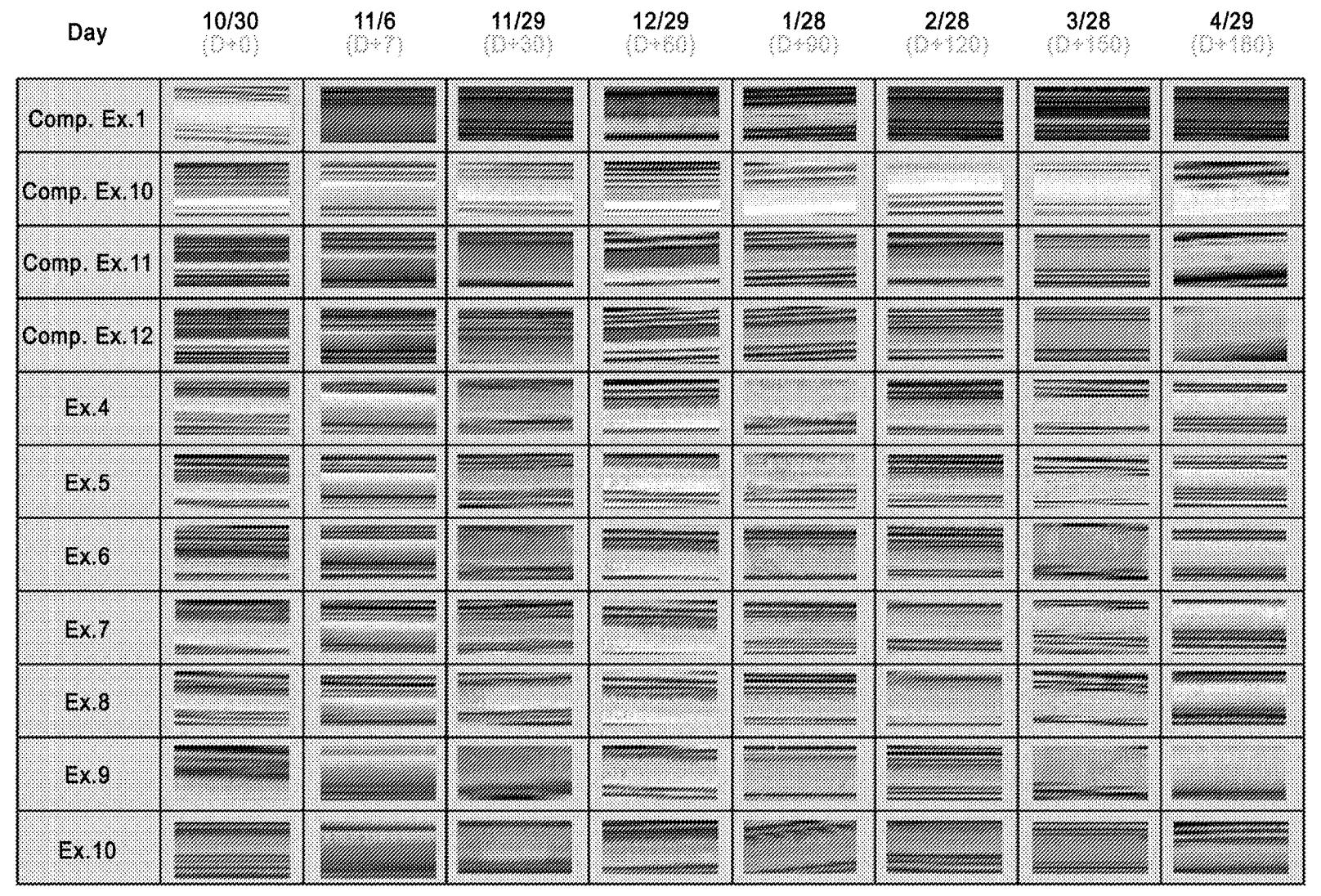

FIG. 3 is a table of images illustrating the degree of discoloration on the outside over time after coating a wiper blade with the compositions of Comparative Examples 1 and 10 to 12 and Examples 4 to 10.

According to FIG. 3, it was confirmed that coating with the coating compositions of Examples 4 to 10 did not show color change even after 180 days and the color at the time of coating was well maintained, which was much better than that with the coating compositions including only boron nitride as a solid lubricant of Comparative Examples 1 and 10 to 12.

The spirit of the present disclosure has been described by way of example hereinabove, and the present disclosure may be variously modified, altered, and substituted by those skilled in the art to which the present disclosure pertains without departing from essential features of the present disclosure. Accordingly, the exemplary embodiments disclosed in the present disclosure and the accompanying drawings do not limit but describe the spirit of the present disclosure, and the scope of the present disclosure is not limited by the exemplary embodiments and accompanying drawings. The scope of the present disclosure should be interpreted by the following claims and it should be interpreted that all spirits equivalent to the following claims fall within the scope of the present disclosure.

What is claimed is:

1. A coating composition for a wiper blade comprising:
   a solid lubricant comprising boron nitride as the main component, wherein the boron nitride is added in an amount of 10 wt % to 15 wt % based on the total weight of the coating composition;
   an organic solvent;
   a binder; and
   an additive.

2. The coating composition of claim 1, wherein the coating composition comprises:
   75 wt % to 88 wt % of the organic solvent;
   2 wt % to 9 wt % of the binder; and
   0.5 wt % to 3 wt % of the additive, based on the total weight of the coating composition.

3. The coating composition of claim 1, wherein the solid lubricant further comprises a pigment.

4. The coating composition of claim 3, wherein the coating composition comprises:
   15 wt % to 21 wt % of the solid lubricant comprising boron nitride, based on the total weight of the coating composition;

70 wt % to 81 wt % of organic solvent;
3 wt % to 10 wt % of binder; and
0.5 wt % to 5 wt % of additive.

5. The coating composition of claim 3, wherein the pigment comprises a pearl pigment or an organic pigment.

6. The coating composition of claim 5, wherein the pearl pigment or organic pigment is added in an amount of 1 wt % to 10 wt % based on the total weight of the coating composition.

7. The coating composition of claim 1, wherein the solid lubricant further comprises at least one selected from the group consisting of graphite, polytetrafluoroethylene, molybdenum disulfide, PE powder, silicone resin powder, silicone rubber powder, and hybrid silicone powder.

8. The coating composition of claim 1, wherein the wiper blade is composed of at least one of natural rubber, butadiene rubber, styrene-butadiene rubber, EPDM rubber, and chloroprene rubber.

9. A coating method comprising coating the coating composition for a wiper blade of claim 1 on a wiper blade.

\* \* \* \* \*